United States Patent
Marquie et al.

(10) Patent No.: US 9,507,851 B1
(45) Date of Patent: Nov. 29, 2016

(54) METHODS AND SYSTEMS FOR PROVIDING RECOMMENDATION INFORMATION

(75) Inventors: Bruno Marquie, St Pierre d'Allevard (FR); Marc Brette, Domene (FR)

(73) Assignee: EMC IP Holding Company LLC, Hopkinton, MA (US)

( * ) Notice: Subject to any disclaimer, the term of this patent is extended or adjusted under 35 U.S.C. 154(b) by 776 days.

(21) Appl. No.: 13/074,188

(22) Filed: Mar. 29, 2011

(51) Int. Cl.
*G06F 17/30* (2006.01)

(52) U.S. Cl.
CPC ... *G06F 17/30648* (2013.01); *G06F 17/30867* (2013.01)

(58) Field of Classification Search
CPC ............. G06F 17/30867; G06F 17/30648
USPC ........................................................ 707/765
See application file for complete search history.

(56) References Cited

U.S. PATENT DOCUMENTS

| | | | |
|---|---|---|---|
| 8,239,418 B1 * | 8/2012 | Baluja et al. | 707/796 |
| 2009/0300009 A1 * | 12/2009 | Rezaei et al. | 707/5 |
| 2009/0313286 A1 * | 12/2009 | Mishra et al. | 707/102 |
| 2011/0225289 A1 * | 9/2011 | Prasad et al. | 709/224 |
| 2012/0036123 A1 * | 2/2012 | Hasan et al. | 707/723 |
| 2012/0136855 A1 * | 5/2012 | Ni et al. | 707/724 |
| 2012/0221558 A1 * | 8/2012 | Byrne et al. | 707/723 |

* cited by examiner

*Primary Examiner* — Grace Park
(74) *Attorney, Agent, or Firm* — Dergosits & Noah LLP; Todd A. Noah

(57) ABSTRACT

A method for providing recommendation information from a network application service is disclosed and includes receiving, by a server, user activity data relating to a first data object of a plurality of data objects in a network application service, and storing the user activity data in a structured storage model comprising a plurality of nodes representing a plurality of items including the first data object, and at least one edge representing user activity data relating to the plurality of items. When a recommendation search criteria relating to the first object is received, recommendation information corresponding to the recommendation search criteria is retrieved and transmitted. The recommendation information is based on at least one inference determined from the structured storage model.

16 Claims, 4 Drawing Sheets

METHODS AND SYSTEMS FOR PROVIDING RECOMMENDATION INFORMATION

BACKGROUND

Online websites, such as those selling books or DVDs, allow users/customers to search for particular products, e.g., books or music, by submitting search terms such as the title of a book, an author, a musical artist, or a topic of a book. A network application service associated with the website typically manages interactions between users and the website. For example, the network application service can receive a search query and retrieve information from a data store satisfying the search query. In some cases, recommendation information is also retrieved and returned. For example, some popular websites provide titles of books that others have selected after viewing the particular book requested by the user.

Typically, recommendation information is generated by a recommendation engine that operates independently from the network application service. In general, user activity data from multiple users is monitored, collected and stored separately from the data managed by the network application service. The collected user activity data is analyzed to produce the recommendation information for a specific user.

In most cases, the user activity data is stored separately from the data managed by the network application service. Unlike that data, which is stored in a manner that promotes search and retrieval, the user activity data is stored in a non-structured, flat manner, and therefore is not easily searchable. Moreover, the recommendation engine is not accessible by the user/customer. Accordingly, unlike the network application service, the recommendation engine does not allow the user/customer to submit a request for recommendation information. Rather, the recommendation information is unilaterally pushed to the user when the user triggers a certain action, e.g., selects a particular book.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

The subject matter presented herein provides for allowing a user to search for and retrieve recommendation information from a network application service. According to an embodiment, user activity data is collected and stored in a structured storage model along with other data objects in the network application service. Inferences can be determined based on the user activity data stored in the structured storage model and once determined can be stored as recommendation information in the network application service. In an embodiment, the recommendation information can be stored as recommendation metadata associated with the data objects in the network application service. Accordingly, the recommendation information can be searched and retrieved in response to a request for a recommendation, or in response to a search criteria referring to an inference.

According to an embodiment, seeking a recommendation can be treated as a discovery/extraction process. User activity data can be analyzed to deduce practical information to compliment existing data objects. Similar to an entity extraction process that compliments an object's typical metadata using grammatical analysis and linguistic context, the recommendation process can enhance the data object with opinions and usage patterns extracted from a social context. The structured storage model can allow a user to access recommendations as any other metadata of a data object. That is, recommendations can be exposed in a search and combined with any other full text or metadata criteria thereby allowing a user to request recommendation information along with other traditional object data.

Figure 1:
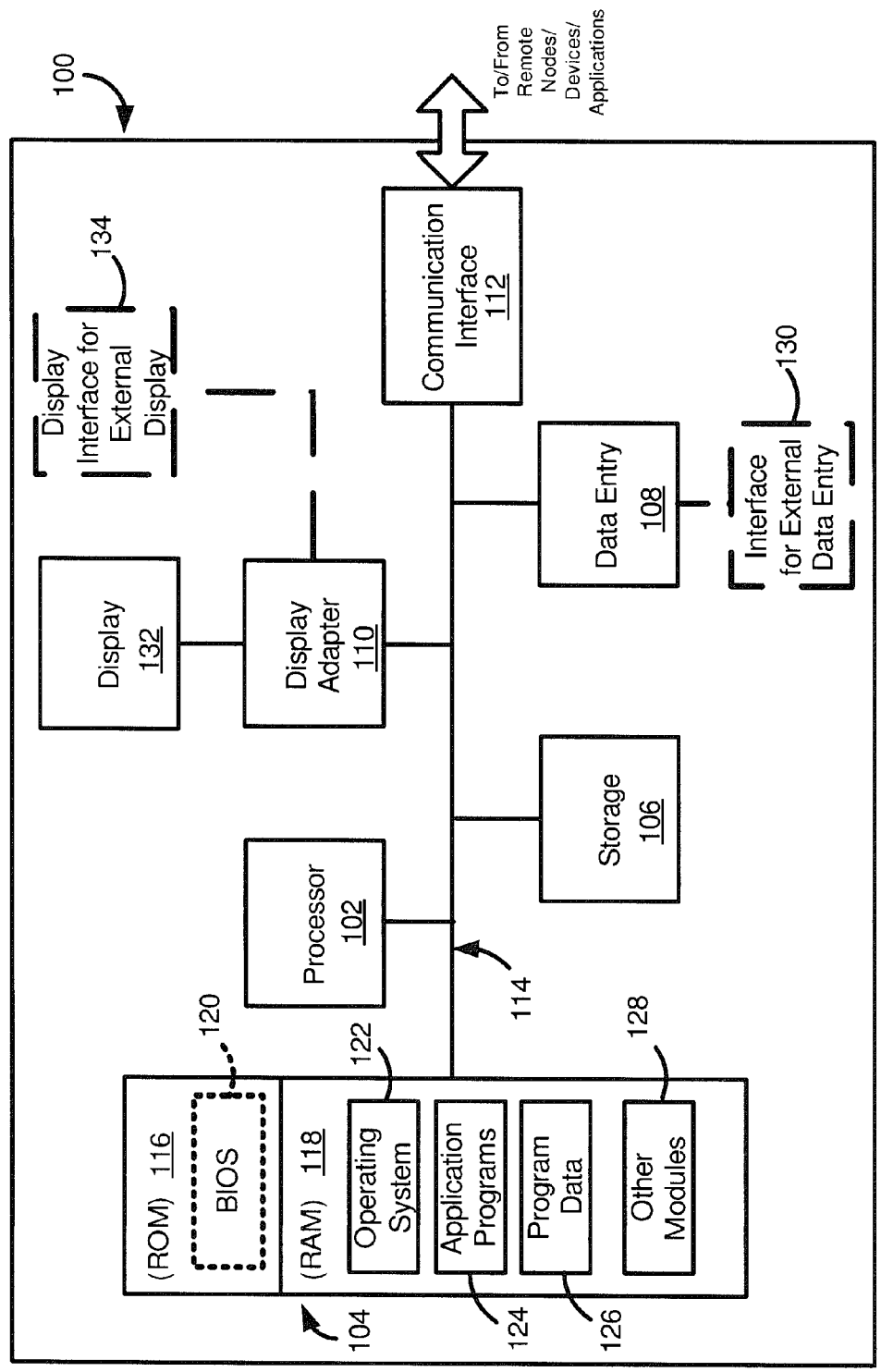
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112.

The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
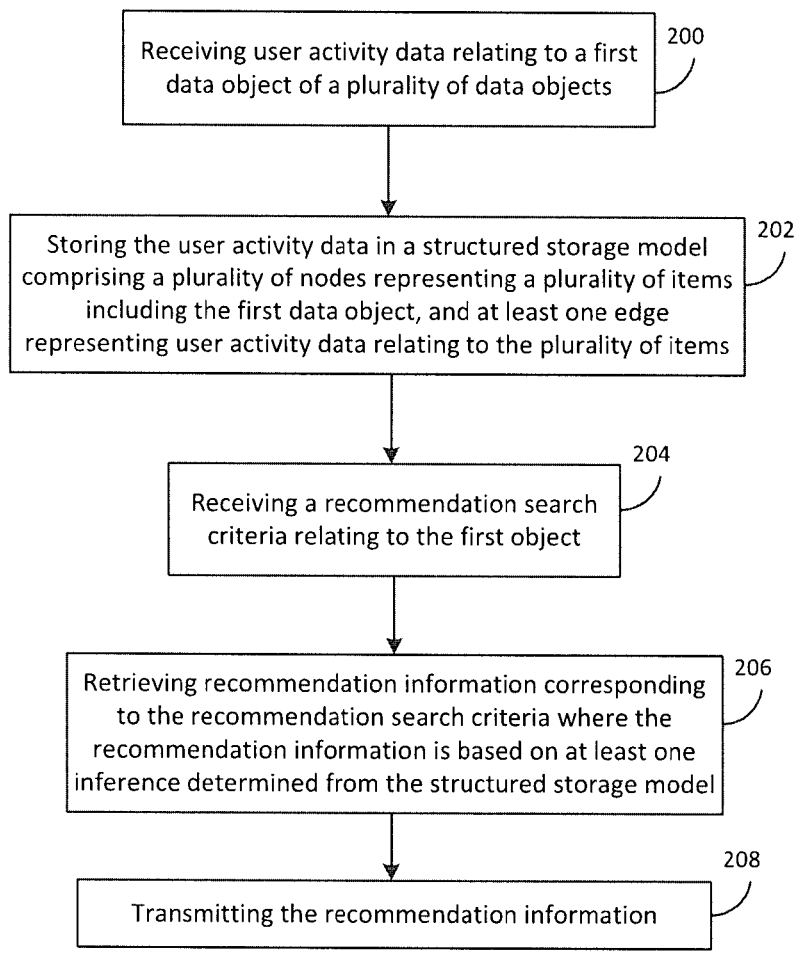
FIG. 2 is a flow diagram illustrating an exemplary method for providing recommendation information from a network application service according to an exemplary embodiment.
Figure 3:
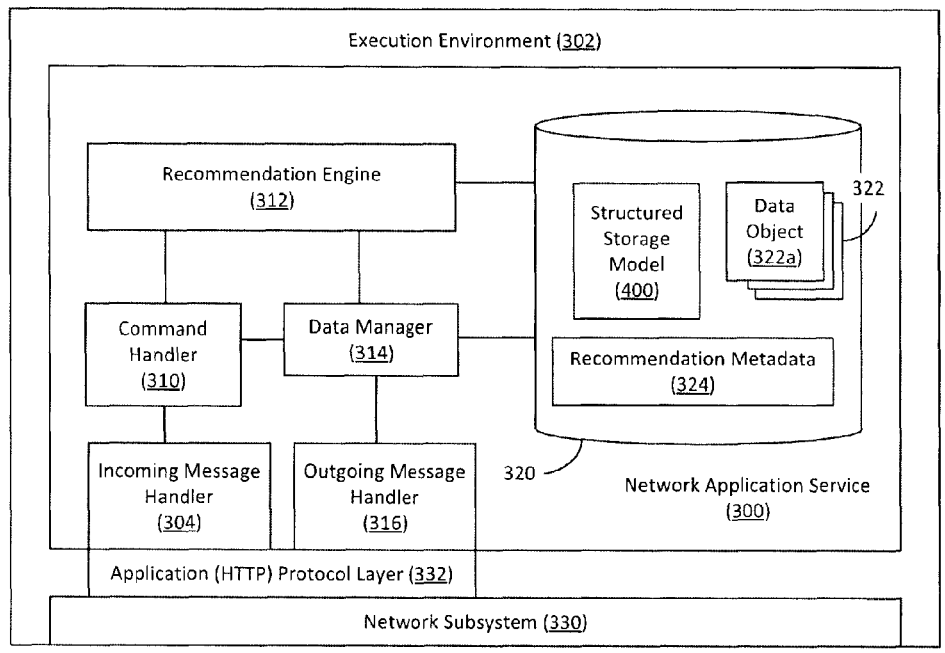
FIG. 3 is a block diagram illustrating an exemplary system for providing recommendation information from a network application service according to an exemplary embodiment.

Referring now to FIG. 2, a flow diagram is presented illustrating a method for providing recommendation information from a network application service according to an exemplary embodiment. FIG. 3 is a block diagram illustrating an exemplary system for providing recommendation information from a network application service according to embodiments of the subject matter described herein. The method illustrated in FIG. 2 can be carried out by, for example, at least some of the components in the exemplary arrangement of components illustrated in FIG. 3. The arrangement of components in FIG. 3 may be implemented by some or all of the components of the hardware device 100 of FIG. 1.

Figure 5:
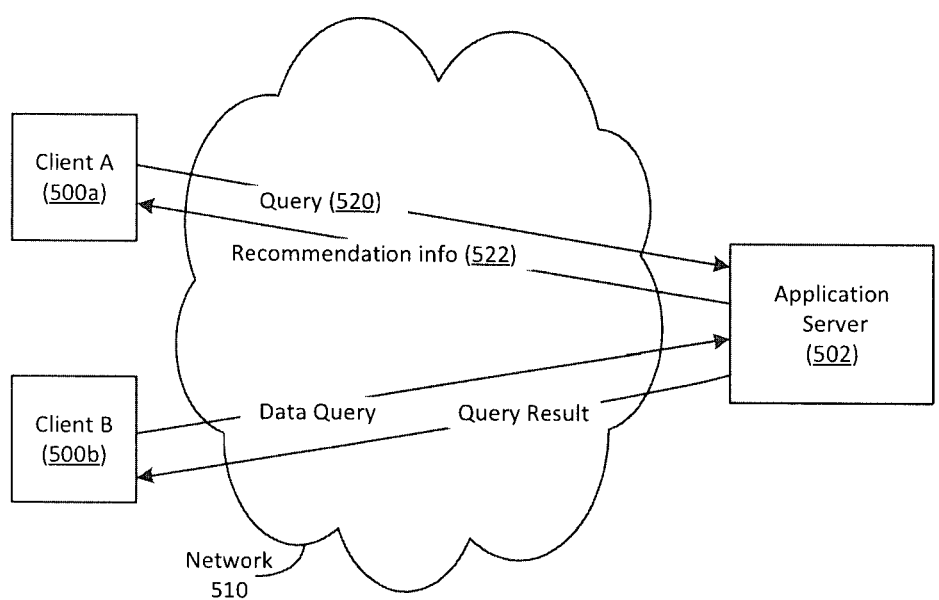
FIG. 5 is a block diagram illustrating a network in which a system for providing recommendation information from a network application service can be implemented.

FIG. 3 illustrates components that are configured to operate within an execution environment hosted by a computer device and/or multiple computer devices, as in a distributed execution environment. For example, FIG. 5 illustrates a plurality of computer devices 500a, 500b, 502 communicatively coupled to one another via a network 510, such as the Internet, where an application server 502 can be configured to provide an execution environment configured to support the operation of the components illustrated in FIG. 3 and/or their analogs. Exemplary computer devices can include desktop computers, servers, networking devices, notebook computers, PDAs, mobile phones, digital image capture devices, and the like. For example, in an embodiment, the application server 502 can be a webserver.

Illustrated in FIG. 3 is a network application service 300 including components adapted for operating in an execution environment 302. The execution environment 302, or an analog, can be provided by a computer device such as the application server 502. Exemplary network application services 300 can, in an embodiment, include content management systems that manage access to content, e.g., documents, B2B management systems that manage retail transactions relating to data objects, and the like. The network application service 300 includes a data store 320, such as a database, that is configured to store a plurality of data objects 322. The data objects 322 are managed by a data manager 314, which can be configured to add, update, and/or delete data objects 322. In addition, the data manager 314 can be configured to receive and process data queries and to retrieve data objects 322 satisfying the data queries.

With reference to FIG. 2, in block 200, user activity data relating to a first data object of a plurality of data objects is received by the network application service. In an embodiment, a system for providing recommendation information from a network application service includes means for receiving user activity data relating to a first object in a network application service. For example, FIG. 3 illustrates a recommendation engine 312 configured to receive the user activity data.

According to an embodiment, the recommendation engine 312 can be adapted to operate in the network application service 300 in an execution environment 302 provided by the server 502. The recommendation engine 312 can receive the user activity data from a client 500a, 500b via the network 510. For example, the network application service 300 can be configured to receive a data query from client B 500b over the network 510 via a network subsystem 330 and an application protocol layer, or other higher protocol layer, as illustrated by an exemplary HTTP protocol layer 332, among many possible standard and proprietary protocol layers. These higher protocol layers can encode, package, and/or reformat data for sending and receiving messages over a network layer, such as Internet Protocol (IP), and/or a transport layer, such as Transmission Control Protocol (TCP) and/or User Datagram Protocol (UDP).

The data query can be a request for a specific data object, e.g., a book or a document, or for a collection of data objects, e.g., all documents related to a particular topic. A command handler component 310 in the content management system 300 can be configured to receive the data query via an incoming message handler 304 and to route the query to the data manager 314. As stated above, the data manager 314 can be configured to process the query, and to retrieve data object(s) 322 satisfying the query. The retrieved data object (s) can be can be received by an outgoing message handler 316, which can be configured to package the object(s) into a query result and to transmit the query result to client B 500b via the network 510.

In response to receiving the query result, e.g., a plurality of documents related to the particular topic, client B 500b can submit a command relating to any of the plurality of objects included in the query result. Such a command corresponds to user activity data. For example, client B 500b can submit a "select" command to select a first data object of the plurality of objects for further review, a "print" command to print the first data object, a "buy" command to place the first data object in a shopping cart, etc. User activity data can be received over the network 510 by the command handler component 310, and routed to the recommendation engine 312.

Referring again to FIG. 2, in block 202, the user activity data is stored in a structured storage model comprising a plurality of nodes representing a plurality of items including the first data object, and at least one edge representing user activity data relating to the plurality of items. According to an embodiment, the recommendation engine 312 can be configured to store the user activity data in the structured storage model. As shown in FIG. 3, the structured storage model 400 is stored in the data store 320 so that the user activity data is accessible by the network application service 300 via the data manager 314.

Figure 4:
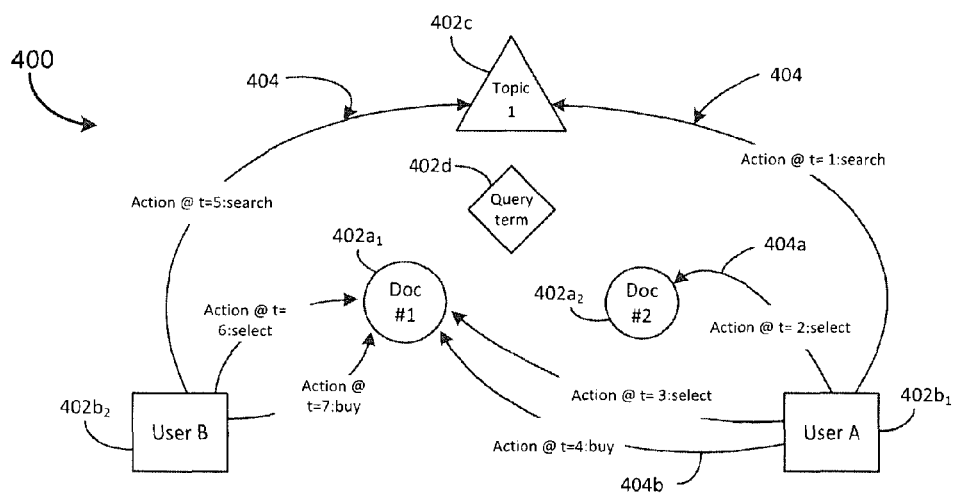
FIG. 4 is a block diagram illustrating an exemplary structured storage model according to an exemplary embodiment.

FIG. 4 is a diagram illustrating an exemplary structured storage model according to an embodiment. As shown, the storage model 400 is a graphical representation having a plurality of nodes 402a-402d representing a plurality of items, and edges 404, 404a, 404b representing actions, i.e., user activity data, relating to the plurality of items. As shown, different nodes can be associated with different item types. Thus, a data object node 402a1, 402a2 can represent a data object 322, e.g., a document, managed by the network application service 300, a user node 402b can represent a user, a topic node 402c can represent a particular topic and a query node 402d can represent a query term.

According to an embodiment, when user activity data relating to a first data object 322a is received, the computational recommendation engine 312 can be configured to store each command as an edge 404 and at least one node, e.g., object node $402a_1$, in the graphical representation 400, and optionally to tag each edge 404 with a timestamp so that a chronology of user activity can be determined. For example, as shown in FIG. 4, User A performs a task comprising a search of Topic 1 420c at t=1, selects Document #2 represented by object node $402a_2$ at t=2, selects Document #1 represented by object node $402a_1$ at t=3, and buys the document represented by object node $402a_1$ at t=4. Similarly, User B searches Topic 1 420c at t=5, selects Document #1 represented by object node $402a_1$ at t=6, and buys Document #1 represented by node $402a_1$ at t=7.

By storing the user activity data in the structured data model 400 represented by the graph, complex user activity sequences can be captured and recorded. Moreover, the graphical representation 400 can capture the dynamic nature of user activities and can quickly represent relationships between items, including data objects 322, and recurrent usage patterns.

According to an embodiment, in addition to storing user activity data in the structured data model 400, the recommendation engine 302 can be configured to analyze the structured storage model 400 and to determine at least one inference relating to the first data object 322a based on at least one edge 404 representing user activity data relating to the first data object in the structured storage model 400. In an embodiment, an edge 404 can be defined by a type associated with a user activity type, and different edge types can be weighted differently depending on specific criteria. For example, a "select" edge 404a can be assigned a weight less than a "buy" edge 404b because a user that buys an object is more interested by the object than a user that merely selects an object.

In an embodiment, the recommendation engine 312 can be configured to examine the structured storage model 400 and to make inferences about the plurality of nodes 402. For example, referring to the structured storage model 400 depicted in FIG. 4, the recommendation engine 312 can determine several inferences. For instance, one inference that can be determined is that document #1 associated with node $402a_1$ and document #2 associated with node $402a_2$ are related to Topic 1 402c based on the fact that both nodes $402a_1$, $402a_2$ were selected after User A performed a search of Topic 1. Another inference that can be determined is that document #1 associated with node $402a_1$ is highly relevant to Topic 1 based on the fact that it was selected by several users, e.g., by User A and User B, after a search of Topic 1. That inference is bolstered further by the fact that document #1 was purchased by Users A and B. Accordingly, the recommendation engine 312 can, in this example, determine that documents #1 and #2 are related to Topic 1, and that document #1 is preferred (and recommended) by Users A and B.

In an embodiment, the inference(s) can be determined periodically or upon request. Alternatively or in addition, the inference(s) can be determined whenever the recommendation engine 312 receives and stores user activity data in the structured storage model 400. Accordingly, when new user activity data relating to the first data object 322a (or any data object 322) is received, the recommendation engine 312 can be configured to update the structured storage model 400 with a new edge 404 representing the new user activity, and to determine at least one new inference relating the first object 322a based on the new edge 504.

In an embodiment, when at least one inference relating to an object, e.g., the first object 322a, is determined, the recommendation engine 312 can be configured to store the determined inference(s) as recommendation metadata 324 of the object 322a. Naturally, when new inferences are determined based on new user activity data, the recommendation engine 312 can be configured for updating the corresponding recommendation metadata 324. The recommendation metadata 324 is stored, in an embodiment, in the database 320 along with the data objects 322 so that it can be accessed by the network application service 300.

Referring again to FIG. 2 in block 204, a recommendation search criteria relating to the first object is received. A system for providing recommendation information from a network application service includes means for receiving the recommendation search criteria. For example, the data manager 314 can be configured to receive the recommendation search criteria relating to the first object 322a.

According to an embodiment, the recommendation search criteria can be included in a query 520. The query 520 can be received by the incoming message handler component 304 operating in the network application service 300 in the execution environment 302 provided by the application server 502. In an embodiment, the query 520 can be received from a client, e.g., Client A 500a, via the network 510, and received by the incoming message handler component 304 via the network subsystem 330 and optionally the higher protocol layer 332. When the query 520 is received, the incoming message handler component 304 can be configured to route the query 520 to the data manager component 314 via the command handler 310.

In an embodiment, the recommendation search criteria can identify the first data object 322a and an inference between the first data object 322a and other data objects 322 and/or metadata associated with data objects 322. For example, the recommendation search criteria can ask for books related to a topic of a particular book (the first data object 322a) recommended by an expert in the topic. In this example, the search criteria refer to a first inference between the topic and the particular book, to a second inference between an author(s) and the topic, and to a third inference between recommended book(s) and the author(s). The first inference can be determined based on user activity data indicating which topic was searched before a purchase of the particular book, the second inference can be determined based on user activity data indicating which books were purchased after a search of the topic and based on the metadata of those books to determine the author(s) of those books, and the third inference can be determined based on the user activity data indicating which books were purchased by the author(s).

In another example, the recommendation search criteria can ask for recommended documents relating to a particular topic. In this example, the recommendation search criteria can identify the particular topic and an inference between the topic and recommended documents. The inference can be determined based on user activity data indicating which documents were printed or retrieved after a search of the topic.

Referring again to FIG. 2, in block 206, recommendation information corresponding to the recommendation search criteria is retrieved. In an embodiment, the recommendation information is based on at least one inference determined from the structured storage model 400. A system for providing recommendation information from a network application service includes means for retrieving recommendation information. For example, the data manager component 314 can be configured to retrieve recommendation information corresponding to the recommendation search criteria, where the recommendation information is based on at least one inference determined from the structured storage model 400.

According to an embodiment, when the query 520 is received, the data manager component 314 can determine that the query 520 includes the recommendation search criteria. For example, the data manager 314 can parse the query 520 and detect and extract the recommendation search criteria. In an embodiment, the data manager 314 can also be configured to retrieve recommendation metadata 324 of the first data object 322a that satisfies at least a portion of the recommendation search criteria. In the event the recommendation metadata 324 of the first data object 322a fails to satisfy any portion of the recommendation search criteria, e.g., because an inference relating to the recommendation search criteria has not been determined based on the storage model 400, the data manager 314 can return a "no results" response.

Alternatively or in addition, the data manager 314 can be configured to invoke the recommendation engine 312 to determine at least one inference satisfying the recommendation search criteria. In this embodiment, the recommendation engine 312 can be configured to receive the recommendation search criteria relating to the first data object 322a from the data manager 314, and to analyze the structured storage model 400 in light of the request. In an embodiment, the recommendation engine 312 can examine at least one edge 404 representing user activity data relating to the first data object 322a. Based on this analysis, the recommendation engine 312 can be configured to determine at least one inference relating to the first data object 322a and satisfying at least a portion of the recommendation search criteria. When the inference(s) is determined, it can be returned to the data manager 314 and optionally stored as recommendation metadata 324 of the first data object 322a.

Referring again to FIG. 2 in block 208, the recommendation information is transmitted. In an embodiment, an outgoing message handler 316 in the network application service 300 can be configured to transmit the recommendation information. For example, the recommendation information 522 can be provided by the data manager 314 to the outgoing message handler 316, which can be configured to build a message including the recommendation information 522. The outgoing message handler 316 can be configured to interoperate directly with the protocol layer of the network subsystem 330 or with an application protocol layer, as described above and illustrated by the exemplary HTTP protocol layer 332. The message including the recommendation information 522 can be transmitted as a whole or in parts via the network subsystem 330 over the network 510 to a client, e.g., client A 500b.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for providing recommendation information from a network application service, the method comprising:
   receiving, by a server, user activity data relating to a first data object of a plurality of data objects in a network application service, the user activity data comprising at least a first user command performed on the first data object and a second user command performed on the first data object, the first user command being a different type of command than the second user command;
   storing, by the server, the user activity data in a structured storage model comprising a plurality of nodes representing a plurality of items including the first data object, and at least one edge representing the first user command and a sequence indicator relating to the plurality of items, wherein the sequence indicator indicates when the first user command is performed relative to another sequence indicator which indicates when the second user command is performed;
   determining at least one inference relating to the first data object using the structured storage model, the at least one inference being based on at least one edge in the structured storage model representing at least one of the first user command and the second user command; and
   storing the at least one determined inference relating to the first data object as recommendation metadata of the first data object;
   receiving, by the server, a recommendation search criteria relating to the first data object
   retrieving, by the server, recommendation information corresponding to the recommendation search criteria, wherein the recommendation information is based on at least one inference determined from the structured storage model; and
   transmitting, by the server, the recommendation information.

2. The method of claim 1 wherein retrieving the recommendation information corresponding to the recommendation search criteria includes retrieving the recommendation metadata of the first data object satisfying at least a portion of the recommendation search criteria.

3. The method of claim 1 further comprising: receiving a new user command relating to the first data object; updating the structured storage model with a new edge representing the new user command; determining at least one new inference relating to the first data object based on the new edge in the updated structured storage model; and updating the recommendation metadata of the first data object with the at least one new inference relating to the first data object.

4. The method of claim 1 wherein retrieving recommendation information corresponding to the recommendation search criteria includes:
   receiving the recommendation search criteria relating to the first data object;
   analyzing the structured storage model in light of the search criteria; and
   determining at least one inference relating to the first data object and satisfying at least a portion of the recommendation search criteria based on at least one edge representing the first user command relating to the first data object.

5. The method of claim 1 wherein the structured storage model is stored with the plurality of data objects in a data store managed by a data manager in the network application service.

6. The method of claim 1 wherein the structured storage model is a graphical representation.

7. A computer program product, comprising computer-readable program code to be executed by one or more processors when retrieved from a non-transitory computer-readable medium, the program code including instructions to:
   receive, by a network application service hosted in a server, user activity data relating to a first data object of a plurality of data objects, the user activity data comprising at least a first user command performed on the first data object and a second user command performed on the first data object, the first user command being a different type of command than the second user command;
   store, by the network application service, the user activity data in a structured storage model comprising a plurality of nodes representing a plurality of items including the first data object and at least one edge representing the first user command and a sequence indicator relating to the plurality of items, wherein the sequence indicator indicates when the first user command is performed relative to another sequence indicator which indicates when another user command is performed;
   determine at least one inference relating to the first data object using the structured storage model, the at least one inference being based on at least one edge in the structured storage model representing at least one of the first user command and the second user command; and
   store the at least one determined inference relating to the first data object as recommendation metadata of the first data object;
   receive, by the network application service, a recommendation search criteria relating to the first data object;
   retrieve, by the network application service, recommendation information corresponding to the recommendation search criteria, wherein the recommendation information is based on at least one inference determined from the structured storage model; and
   transmit, by the network application service, the recommendation information.

8. The computer program product of claim 7 wherein retrieving recommendation information corresponding to the recommendation search criteria includes retrieving recommendation metadata of the first data object satisfying at least a portion of the recommendation search criteria.

9. The computer program product of claim 7, wherein the program code includes further instructions to: receive a new user command relating to the first data object; update the structured storage model with a new edge representing the new user command; determine at least one new inference relating to the first data object based on the new edge in the updated structured storage model; and update the recommendation metadata of the first data object with the at least one new inference relating to the first data object.

10. The computer program product of claim 7 wherein retrieving recommendation information corresponding to the recommendation search criteria includes:
    receiving the recommendation search criteria relating to the first data object;
    analyzing the structured storage model in light of the search criteria; and
    determining at least one inference relating to the first data object and satisfying at least a portion of the recommendation search criteria based on at least one edge representing the first user command relating to the first data object.

11. A system for providing recommendation information from a network application service, the system comprising:
    a processor-based application, which when executed on a computer, will cause the processor to:
    receive user activity data relating to a first data object of a plurality of data objects in a network application service, the user activity data comprising at least a first user command performed on the first data object and a second user command performed on the first data object, the first user command a different type of command than the second user command;
    store the user activity data in a structured storage model comprising a plurality of nodes representing a plurality of items including the first data object, and at least one edge representing the first user command and a sequence indicator relating to the plurality of items, wherein the sequence indicator indicates when the first user command is performed relative to another sequence indicator which indicates when another user command is performed;
    determine at least one inference relating to the first data object using the structured storage model, the at least one inference being based on at least one edge in the structured storage model representing at least one of the first user command and the second user command; and
    store the at least one determined inference relating to the first data object as recommendation metadata of the first data object;
    receive a recommendation search criteria relating to the first data object;
    retrieve recommendation information corresponding to the recommendation search criteria, wherein the recommendation information is based on at least one inference determined from the structured storage model; and
    transmit the recommendation information.

12. The system of claim 11 wherein the processor-based application, when executed on a computer, will further cause the processor to retrieve recommendation metadata of the first data object satisfying at least a portion of the recommendation search criteria.

13. The system of claim 11 wherein the processor-based application, when executed on a computer, will further cause the processor to: receive a new user command relating to the first data object; update the structured storage model with a new edge representing the new user command;

determine at least one new inference relating to the first data object based on the new edge in the updated structured storage model; and update the recommendation metadata of the first data object with the at least one new inference relating to the first data object.

14. The system of claim 11 wherein the processor-based application, when executed on a computer, will further cause the processor to:

receive the recommendation search criteria relating to the first data object from the data manager;

analyze the structured storage model in light of the request; and determine at least one inference relating to the first data object and satisfying at least a portion of the recommendation search criteria based on at least one edge representing the first user command relating to the first data object.

15. The system of claim 11 wherein the structured storage model is stored with the plurality of data objects in a data store managed by the data manager in the network application service.

16. The system of claim 11 wherein the structured storage model is a graphical representation.

* * * * *